United States Patent [19]

Bölkow et al.

[11] Patent Number: 4,498,764
[45] Date of Patent: Feb. 12, 1985

[54] DYNAMIC CONTROL ARRANGEMENT FOR A DISTANCE MEASURING APPARATUS

[75] Inventors: Ludwig Bölkow, Oberfeldallee 9, D-8022 Grünwald; Walter Mehnert, Ottobrunn; Hoiko Chaborski, Munich, all of Fed. Rep. of Germany

[73] Assignee: Ludwig Bölkow, Grünwald, Fed. Rep. of Germany

[21] Appl. No.: 386,026

[22] Filed: Jun. 7, 1982

[30] Foreign Application Priority Data

Jun. 9, 1981 [DE] Fed. Rep. of Germany ....... 3122806
May 24, 1982 [DE] Fed. Rep. of Germany ....... 3219452

[51] Int. Cl.$^3$ .................................................. G01C 3/08
[52] U.S. Cl. ............................................. 356/5; 356/4
[58] Field of Search ......................................... 356/4, 5

[56] References Cited

U.S. PATENT DOCUMENTS

| | | | |
|---|---|---|---|
| 2,956,472 | 10/1960 | Hildebrand | 356/5 |
| 3,402,630 | 9/1968 | Blau et al. | 356/5 |
| 3,519,829 | 7/1970 | Pradel et al. | 356/4 |
| 3,619,058 | 11/1971 | Hewlett et al. | 356/5 |
| 3,652,161 | 3/1972 | Ross | 356/5 |
| 3,779,645 | 12/1973 | Nakazawa et al. | 356/5 |
| 3,802,775 | 4/1974 | Hughes | 356/28.5 |
| 3,813,165 | 5/1974 | Hines et al. | 356/5 |
| 3,941,999 | 3/1976 | Moyers, Jr. | 356/5 |
| 4,297,030 | 10/1981 | Chaborski | 356/5 |

*Primary Examiner*—S. C. Buczinski

[57] ABSTRACT

The invention provides a distance measuring apparatus for determining the distance of a target object as a function of the transit time of a measurement light pulse which is emitted by a transmitter in the transmission portion of the apparatus towards the target object, reflected thereby and received by the receiving portion of the measuring apparatus and for attainment of superior measurement accuracy the intensity of the measurement light pulse is correlated to the distance and reflectivity of the target object as well as to the "transparency" of the transmission medium between the measuring apparatus and the target object, such correlation being effected by optical damping of either the transmitted light pulses and/or the reference light pulse and/or the light pulses reflected by the target. Optical damping may advantageously be effected by means of a light path change-over switch which feeds a light pulse, generated by the transmitter by controlling the timing of a trigger generator for the transmitter, so that the full intensity or attenuated optic light is passed either into a transmitting measurement light path or into a reference light path having a known transit time for the reference light therein, electrical delays inherent in the apparatus and causing errors in distance measurement being compensated for by subtracting the transit time measurement values of reference light pulses from transit time measurement values of transmitted measurement light pulses.

27 Claims, 7 Drawing Figures

DYNAMIC CONTROL ARRANGEMENT FOR A DISTANCE MEASURING APPARATUS

FIELD OF THE INVENTION

The invention relates to a distance measuring or apparatus for measuring distance as a function of the measurement transit time measurement of a measuring light pulse from a transmitter to a target and from the target to a receiver.

BACKGROUND OF THE INVENTION

Distance measuring apparatus of the foregoing kind is described, for example, in published German patent application P 31 03 567.1. There, the branching point is fixed and the light pulse emitted by the transmitter is split into two parts, one of which is emitted as a measuring light pulse to the target object and the other is fed as a reference light pulse directly to the detector equipment which is started by the reference pulse and "stopped" on reception of the reflected pulse, the time interval between starting and stopping being a dependable measure of distant targets. The problem of adapting the intensity of the emitted measuring light pulse to the reflectivity and distance of the target object and the intensity of the reference light pulse to that of the reflected measuring light pulse is solved in the noted publication by use of damping components which are arranged in the light path between the optical receiving system and detector equipment or in the reference light path and in principle can be of any desired kind. The damping components are required because the intensity of the received measuring light pulse can fluctuate within wide limits for reasons stated, and because of the effect of the light permeability of the medium lying between the measuring instrument and the target object. Because the receiver of the detector equipment has a small dynamic range in comparison with the range of the amplitude of the reflected light pulse, it is necessary for the attainment of high measurement accuracy to reduce the intensity (high for large distance measurement) of measurement, of the light pulses emitted by the transmitter for very small distances and/or for distance measurements of highly reflecting target objects. Since moreover the response behaviour of the receiver can change in dependence on the intensity of the light pulse impinging on the photo-detector therein, it is necessary for the attainment of as uniform as possible a processing of measurement light pulse and reference light pulse that the latter possesses approximately the same amplitude as the light pulse reflected by the target object. In the case of very far removed and/or badly reflecting target objects, it is therefore required correspondingly to reduce the amplitude of the reference light pulse.

Damping components are known and may comprise iris diaphragms or insertable filters. These components however are either comparatively large and slow to react and therefore unsuitable for high measurement frequencies or expensive and not readily usuable.

An objective of the invention is to provide a distance measuring instrument of the foregoing kind which is simple, reliable, operates at high speed and at low cost and which provides light pulse intensity damping means effective to damp at least one of the following (a) the light pulse transmitted to the target, (b) a reference light pulse in a reference light path and/or (c) the light pulse reflected from the target.

SUMMARY OF THE INVENTION

In practicing the invention, I start the transmit time measurement not by a reference light pulse branched off from the measuring light pulse, but by an electrical trigger pulse, which is delivered by the trigger generator and which causes the transmitter to deliver a light pulse, so that in effect a signal transit time measurement is made, wherein the signal initially appears in electrical form, then as light pulse and then again as an electrical signal. The influence of the signal delays in that case occurring during both the "electrical" phases and their fluctuation and drift phenomena on the measurement result are eliminated by virtue of a reference light pulse being directed into a reference light path internally of the instrument immediately before and/or after the measuring light pulse is emitted to the target object while the usual transit time measurement, as above described, is performed. Since the "electrical" delays encountered in the measured time of travel for a measuring light pulse and in the measured time of travel for a reference light pulse are essentially the same, where the measuring light pulse and the reference light pulse are triggered within a short period of time (say within 100 microseconds) exact distance values may be obtained by simply subtracting the time measurement values of the reference light pulses from the time measuring values of the measurement light pulses. By thus subtracting the two measurements a value is obtained which is the difference between the actual time of travel of the measuring light pulse and actual time of travel of the reference light pulse and since the value of the latter is known and is a constant it can be eliminated by determining the travel time of a measuring pulse for a target having zero distance, i.e. by determining the zero distance point of the apparatus.

For the feeding-in, required in that case, of the light pulse emitted by the transmitter once into the measurement light path and once into the reference light path, a movable light path change-over switch is provided which positions (a) appropriate measurement light settings (feeding-in of the light pulse) in a measurement light path and (b) calibration light settings (feeding-in of the light pulse in a calibration light path.

Within the scope of the concept according to the invention, namely of so controlling the time of impingement of the light pulses onto the movable light path change-over switch that the desired damping is attained through the instantaneous setting of the light path change-over switch, there lie the following three preferred variants:

(a) only a single feeding-in section, which leads further, of the measurement light path and/or only a single feeding-in section, which leads further, of the reference light path lies in the exit region of the light path change-over switch which can be formed by a periodically oscillating mirror, a mirror prism rotating at approximately constant angular speed or a disc having deflecting mirrors and light passage openings and rotating at an approximately constant angular speed. For the attainment of a damping of 50% for example, care is in that case taken that a light pulse impinges at such time on the mirror, the mirror prism or the rotating disc that due to the instantaneous setting of the light path change-over switch, only half of the light quantity contained in the light pulse falls into the entry window of the light path leading further, while the other half runs past the entry window and/or is absorbed. For the attainment of a lesser or greater damping, correspondingly different impact times are chosen for the light pulse on the light path change-over switch in order to increase or to reduce the proportion of light falling into the light path leading further. The advantage of such an arrangement, which operates with a variable partial covering of the light paths in the instant of the passage of a light pulse through the separating point, consists in that a continuous damping lets itself be performed within wide limits. Difficulties however arise here when the light pulse possesses a space-time dispersion, because the temporal centre of gravity of the transmitted part of a light pulse can then be displaced in different manner relative to the temporal centre of gravity of the undivided light pulse in dependence on the chosen degree of damping, which has a direct effect on the transit time measurement to be performed for the distance determination.

(b) This last mentioned problem can be solved thereby, that for the measurement light path and/or for the reference light path, one provides several feeding-in sections, which are functionally parallel one to the other and which are then in the further course again combined into a single measurement or reference light path and of which each comprises a damping device with a fixed damping factor which differs each time from the damping factors in the other sections. Thus, a desired damping lets itself be attained in that the entire light pulse is directed with the aid of the light path change-over switch each time into that feeding-in section, in which a filter or the like effecting this damping is arranged. Although the damping lets itself be changed only stepwise in this manner, this does however not lead to any special problems, since at least the photo-electric receiver can always process a certain amplitude range and the damping factors of the different damping equipments can be so matched one to the other that the product of the respectively smaller damping factor and of the dynamic range of the receiver is somewhat greater than the next greater damping factor so that a slightly overlapping adjoining of the individual damping range results in a gapless overall damping range. If beyond that also still the transmitter performance is variable, then the dynamic factor thus standing at disposal can likewise be taken into this product so that correspondingly larger differences between the damping factors of the individual filters, and with the overall damping range remaining the same, a smaller number of filters results.

In those cases, in which the structure of the light pulses permits this, one can according to the invention here also operate additionally with partial overlapping of the light paths, whereby the number of the functionally mutual parallel light path sections and thereby also of the required damping equipments lets itself be reduced.

(c) A particularly preferred and advantageous variant combines parts of the variants (a) and (b) in such a manner that several mutually parallel feeding-in sections for the respective light path are not required and yet a partial overlapping of the light paths need not be operated with. This occurs thereby, that damping elements, for example filters of different damping factors, are continuously brought by the permanent periodic movement of the light path change-over switch into the light path, in which the light pulses shall be damped, and the light pulses are so generated that they arrive at the light path change-over switch at the instant, at which the desired damping element is offered to them.

Here, too, one can still operate additionally with partial overlapping of light paths. If one does not want to do this, then likewise only a stepwise change of the damping factors is possible. For the reasons already named under (b), no particular difficulties however arise hereby.

For all three variants, it is possible in principle to perform the damping of the measuring light pulses either before their emission to or after their return from the target object. The latter case is preferred, because in this case also the ambient light directed by the target object or its environment into the receiving light path is damped in the same manner as the measuring light and errors, which arise through different ambient light in the avalanche diode, are thus eliminated and, at the same time, however the signal-to-noise ratio is improved substantially. To realise this damping on the receiving side, it is merely required to so match the light path change-over switch and the receiving light path in its constructional refinement one to the other that not only the transmitted light, but also the received light impinges on the light path change-over switch and is conducted further by this to the receiver.

A rotating disc, provided according to the invention as light path change-over switch for realisation of the variant (c), preferably on the one hand has a plurality of openings, which let the light coming from the transmitter through rectilinearly and without partial overlapping as measuring light, and, at the same radial spacing from the rotational axis, a plurality of mirrors, each of which is suitable to deflect the light coming from the transmitter into the reference light path. On the other hand, the disc at a different radial spacing from the rotational axis has a further plurality of openings which move through the path of the measuring light returning from the target object and which contain the filters supplying the different damping values. The openings letting the transmitted light through as well as also the mirrors and the openings letting the reference light through are each combined into equally large groups, wherein all present different damping factors are always represented in one group of the received light openings. A group of received light openings is associated with each group of transmitted light openings and each group of mirrors in such a manner that a measuring light pulse issuing through a certain transmitted light opening on its return from the target object passes through a certain received light opening or that on the arrival of a reference light pulse, reflected by a certain mirror, at the receiver, the ambient light which is passed through a certain received light opening impinges there at the same time. Thereby, on the one hand, the desired damping can already be determined by the selection of the "correct" transmitted light opening for a measuring light pulse and, on the other hand, care can be taken through "correct" selection of the mirror for the associated reference light pulse that the light conditions at the receiver for both pulses are as equal as possible one to the other, for which it is presupposed that the amplitude of the reference light pulse is matched as far as possible to that of the measuring light pulse arriving at the receiver by a damping equipment, which is arranged in the reference light path and which comprises an invariable damping element and a controllable optical damper.

If one arranges the above mentioned groups of transmitted light openings and mirrors or associated received light openings on the disc in such alternation that in the received light openings, the different filters, which are present in like manner in each group, also have the same sequence in each group, then after the correct damping has been found through trial measurements, the entire arrangement lets itself be so operated strictly periodically for the obtaining of several individual measurement values for the measuring light transit time as well as also for the reference light transit time, from which mean values are then formed before or after the subtraction for the obtaining of a single, particularly accurate distance measurement value, that a measuring light pulse and a reference light pulse are always received in alternation at exactly equal time spacings at the receiver.

The analog circuits, which further process these pulses, like all analog circuits have the property that the magnitude of the error, which is superimposed by them on the measurement signal to be processed, depends on the time spacing between two successive signal processing operations of like kind. Through the periodicity of the drive, it is ensured according to the invention, that these errors enter with the same magnitude into the transit time values of the measuring light pulses as well as also of the following associated reference light pulses and thus cancel out in a comparison step as hereinafter described.

Beyond that, a time base signal generally finds use in the time measuring device of a distance measuring instrument under discussion here, which time base signal comes into use at the most diverse places and is therefore unavoidably present on practically all conductors as a periodically fluctuating interference signal, even if very small.

If one now operates the arrangement not at a desired periodicity, but at a sequence frequency, which amounts to an integral multiple of the frequency of the time base signal, then also the interference voltages caused by the time base signal enter into the analog signals at the same amplitude and therefore again drop out during the succeeding difference formations, and the time measuring operation is simplified.

If a sufficiently high frequency, for example 15 MegaHertz is chosen for the time base signal, then the above described periodic operation lets itself be performed readily with fulfillment of the condition that the light pulses shall pass the openings of the rotating disc with full overlap with the preceeding and following ray paths.

If such a distance measuring instrument is now supplied with current from a battery, then a problem arises therefrom, that the different voltages needed in the instrument must be generated with the aid of a vibratory converter, the pulse edges of which then make an exact measurement impossible when they coincide with the generation of signal starting or terminating a transit time measurement.

To avoid this error source, it is advantageous so to control the trigger generator in time that the light pulses impinge on the light path change-over switch not only at the correct instants for the desired damping, but also so that beyond this start and end of the signal transit time measurements fall into periods, in which no interferences caused by pulse edges of the vibratory converter arise.

If one now wants to operate the distance measuring instrument for the attainment of a particularly high measurement accuracy in the above described manner periodically and synchronously with the time base signal, then this condition no longer lets itself be realised. In this case, it is provided according to the invention to key out the vibratory converter, i.e. to suppress its oscillations for a short time, in the periods, into which the start or end of a transit time measurement fall, and instead thereof to feed the current supply from a buffer capacitor. This is possible without great technical effort, since only periods in the order of magnitude of 60 to 70 microseconds are concerned in that case even for large distances.

BRIEF DESCRIPTION OF THE DRAWING

The invention is described in the following with the aid of examples of embodiment with reference to the drawing; in this, there show.

DESCRIPTION OF PREFERRED EMBODIMENTS OF THE INVENTION

Figure 1:
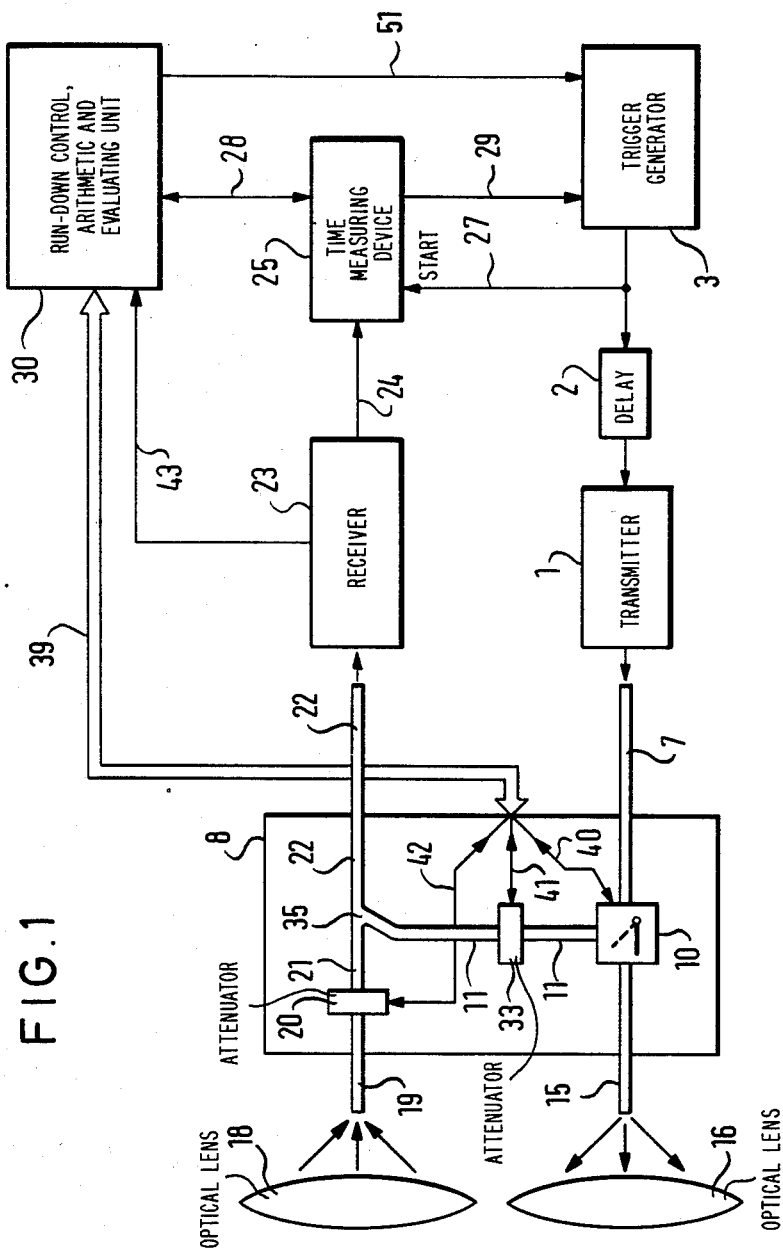
FIG. 1 a schematic block diagram of a distance measuring instrument, in which the dynamic control is performable according to the invention with the aid of an optical switching and damping unit arranged in the transmitting and receiving light paths, FIG. 2 the schematic illustration of a first embodiment for an optical switching and damping unit according to FIG. 1, FIG. 3 a second, particularly preferred embodiment for an optical switching and damping unit according to FIG. 1

As represented in FIG. 1, a distance measuring instrument operating on the general principle of light pulse transit time measurement comprises a transmitter 1, which can for example comprise a Laser transmitting diode and a circuit arrangement, which supplies this transmitting diode with energy and which consists substantially of a "slowly" chargeable energy store in the form of a capacitance and a controllable electronic switch which serves to discharge the energy collected in the energy store rapidly through the transmitting diode for the generation of a Laser light pulse.

The drive of this switch takes place through a trigger generator 3, the output signal of which at the same time serves also for the start or as preparatory signal for the start of the respective signal transit time measurement. Connected between the trigger generator 3 and the transmitter 1 is a delay member 2, which on the one hand takes care that the stop signal for the transit time measurement has a sufficiently large spacing in time from the start signal even when measuring a very short distance so that both these signals can readily be processed one after the other by one and the same time measuring channel and which on the other hand has the effect that the signal transit time measurement is started before that instant and thereby free of interference, in which the transmitter reacts to the trigger signal by the generation of a very rapid and comparatively great current pulse through the transmitting diode, during which very strong interference signals are generated, which would make it extraordinarily difficult exactly in time to detect a start signal, which is delivered exactly at the same time or shortly after the light pulse generation by the transmitter 1, for the signal transit time measurement.

The light pulses generated by the transmitter 1 are fed through a transmitting light path 7 to an optical switching and damping unit 8, which for example contains a mechanically movable light path change-over switch 10, which in accordance with its setting directs a light pulse issuing from the transmitting light path 7 either into a transmitting measurement light path 15 or into a reference light path 11 internally of the instrument.

The light pulses, which are fed by the light path change-over switch 10 in its measurement light setting into the transmitting measurement light path 15, are conducted further to an optical transmitting system 16, which is illustrated simplified as a single lens and emits the light pulses to the target object, the distance of which is to be measured.

The part, which is reflected by the target object, of each light pulse is fed by the optical receiving system 18, likewise illustrated schematically as a single lens in FIG. 1, through a receiving measurement light path 19, a variable optical damper 20 contained in the optical switching and damping unit 8, and a receiving light path 21 and 22 to a receiver 23, which for example as light-electrical transducer comprises a photo-diode with an amplifier and signal generating circuit which is connected there behind and serves to feed a signal, which is generated on the reception of a light pulse, through a line 24 to a time measuring device 25 as stop signal in order to terminate the signal transit time measurement performed by this time measuring device for the light pulse concerned. This signal transit time measurement was previously correlated, as mentioned above, with the trigger signal which was delivered by the trigger generator 3 and which is feedable through the line 27 to the time measuring device 25.

For the case that the output signals of the trigger generator 3 shall be synchronised with a time base signal generated in the time measuring device 25, a line 29 is provided, through which corresponding signals can be transmitted from the time measuring device 25 to trigger generator 3.

The time measurement results obtained by the time measuring device 25 are conducted through the lines 28 to a storage and computing means such as a central run-down control, arithmetic and evaluation unit 30, which on the one hand determines the corrected distance measurement values from these transit time measurement values and causes them to be indicated and which on the other hand controls the functional courses in the entire measuring instrument. Preferably, this run-down control, arithmetic and evaluating unit 30 can comprise a microprocessor.

The light pulses fed by the light path change-over switch 10 in its reference light setting into the reference light path 11 pass through an optical damper 33, which in a given case is controllable, and are conducted at a branch point 35 into the part 22 of the receiving light path leading to the receiver 23. The reference light pulses running over this path from the transmitter 1 to the receiver 23 are subject, at the transmitter side in respect of the trigger signal and at the receiver side up to the generation of the stop signal for the time measuring device 25, to the same delay and signal processing times as the measurement light pulses, from which they differ essentially merely in respect of the length of the light path traversed between the light path change-over switch 10 and the branch point 35. Since the length of this reference light path 11 and thereby also the time required for its traverse is very accurately known, the above mentioned delay and signal processing times, which are effective also for the signal transit time measurements over the measured distance, can be eliminated by subtracting from the measurement value of the measuring light pulse transit time the measuring value of the reference light pulse transit time.

A signal exchange between the optical switching and damping unit 8 and the run-down control, arithmetic and evaluating unit 30 takes place by way of the line 39, which can be constructed to be multi-core or bi-directional, so that data concerning the instantaneous setting of the light path change-over switch 10 can be transmitted through the line 40 to the run-down control, arithmetic and evaluating circuit 30 and command signals adapted to the respective state of operation can be delivered by the run-down control, arithmetic and evaluating unit 30 through the lines 41 and 42 to the optical dampers 20 or 33.

According to the invention, the light path change-over switch 10 can now be used either directly to change the intensity of the light pulses, which are generated by the transmitter 1 and issue from the transmitting light path 7, before these get to the optical transmitting system 16 or are fed into the reference light path 11, or it can be combined in most advantageous manner with the optical damper 20, which serves for dynamic control, for the attainment of a particularly simple, optimally operable dynamic control arrangement leading very rapidly to extremely exact measurement results.

Figure 2:
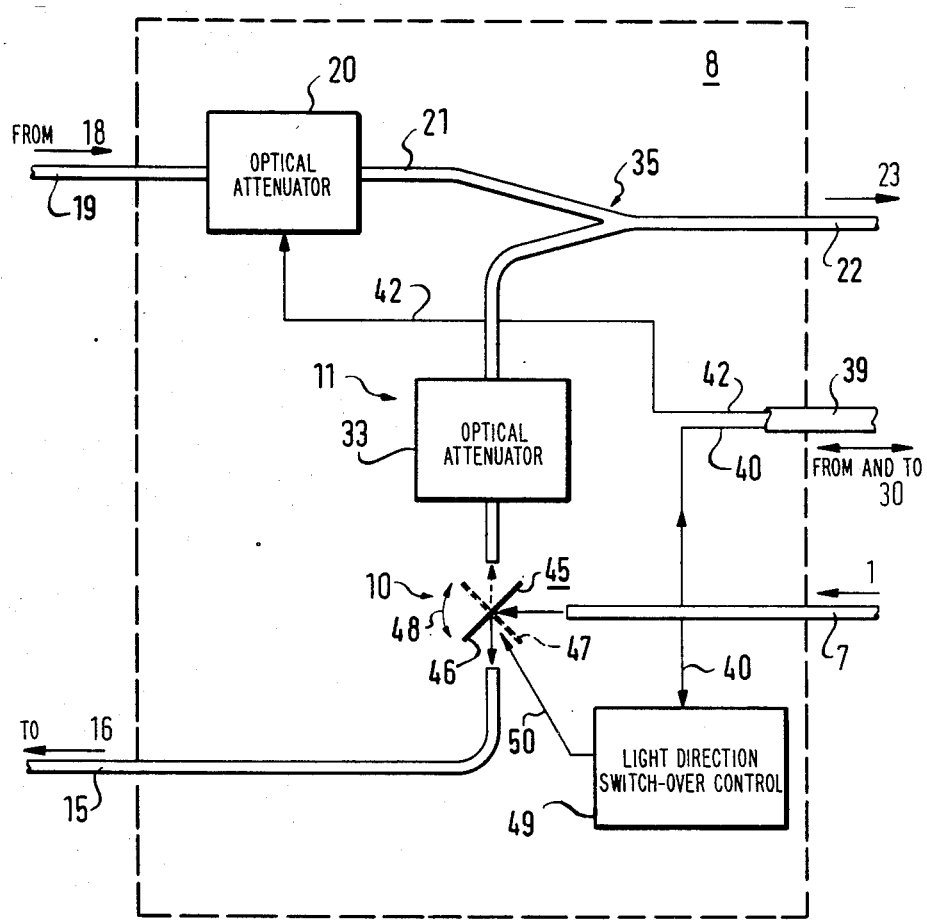

The direct intensity control with the aid of the light path change-over switch 10 is now explained with reference to the example of embodiment illustrated in FIG. 2. In FIG. 2, the light path change-over switch 10 is formed by an oscillatory mirror 45, which is periodically movable to and fro between a measurement light setting 46 and a reference light setting 47 represented by a dashed line, which shall be indicated by the bent arrow 48. The angular spacing between both the named settings is illustrated greatly exaggerated for the sake of clarity in FIG. 2. Actually, both the settings can lie substantially more closely together so that the switchover operation can be performed very rapidly. The control of the oscillatory mirror 45 takes place through a control unit 49, as this is indicated by the line 50. The measurement light setting 46 and the reference light setting 47 of the oscillatory mirror 45 distinguish themselves thereby, that in them a maximum proportion of the light energy issuing during the emission of a light pulse from the transmitting light path 7 is fed into the associated transmitting measurement light path 15 or reference light path 11. In order to secure this maximum feeding-in of light in spite of the permanent periodic movement of the oscillatory mirror 45, the instance, at which the trigger generator 3 each time delivers a trigger signal, must be correlated exactly in time with the movement of the oscillatory mirror 45 in order that the light pulses issuing from the transmitter 1, which responds with delay, impinge at the right moment onto the oscillatory mirror 45. If there is a time displacment for trigger signal generation the oscillatory mirror 45 will direct only a part of the light of the light pulse issuing from the transmitting light path 7 into path 15 or 11. Thus, the amplitude of the light pulses in paths 15 or 11 can be be changed within wide limits by a suitable time control of trigger signal generation. For this purpose, it is advantageous that the control unit 49 supplies through line 40 data concerning the instantaneous setting of the oscillatory mirror 45 and the receiver 23 delivers through line 43 (see FIG. 1) data concerning the instantaneous amplitude of the corresponding signals through the line 43 to the run-down control, arithmetic and evaluating unit 30 which provides, through line 51 to trigger generator 3, control signals effecting a corresponding time displacement of the trigger signals. In this case, it is possible to dispense with a variable optical damper 33, in the reference light path 11, and to use instead a filter with a fixed damping ratio, to the intensity of the reference light pulses to the extent that an adaptation of the reference light intensity to the measurement light intensity need be performed by the oscillatory mirror 45 only within the dynamic range processable by the receiver 23.

The optical damper 20 can be omitted when not only the intensity of the reference light pulses, but also that of the measurement light pulses is controlled with the aid of the oscillatory mirror 45. It is however advantageous for the attainment of a good signal-to-noise ratio to damp not the light pulses emitted by the measuring instrument, but those reflected from the target object for the control of the dynamic range, since thereby at the same time also the ambient brightness and the noise caused thereby is reduced. This damping of the reflected light pulses takes place with the aid of the optical damper 20, which during the performance of the signal transit time measurements by way of the reference light path 11 beyond that also serves to damp the ambient light, which is received by the optical receiving system 18 at these times and gets to the receiver 23, to the same extent as this occurs over the measurement light path during the respectively associated signal transit time measurement.

On the use of a periodically moving oscillatory mirror 45 as light path change-over switch 10, which for example operates as a frequency of 5 kiloHertz to 10 kiloHertz, the ends of the light fibre conductors, which in the FIGS. 1 and 2 form the transmitted measurement light path 15 or the reference light path 11, can be so arranged that the measurement light setting 46 or the reference light setting 47 is displaced from the reversal points of the oscillatory mirror. In such event, the measurement frequency as well as also the sequence frequency of the reference light pulses may be doubled, since the measurement light setting 46 as well as also the reference light setting 47 is traversed twice during each full oscillation of the mirror 45.

In place of the oscillatory mirror 45 illustrated in FIG. 2, a mirror prism can according to the invention be used for the attainment of a higher light pulse sequence frequency, which prism rotates uniformly around an axis standing perpendicularly to the plane of the drawing. Then, only an approximate constancy of the angular speed must be taken care of by the control 49 and a signal characterising the passage of each mirror surface through a certain angular setting must be generated and passed on through the line 40 to the run-down control, arithmetic and evaluating unit 30.

The light paths 7, 11, 15, 19 and 21 are illustrated in the FIGS. 1 and 2 exclusively as light fibre conductors, wherein condenser and imaging lenses to be provided in front or behind the end faces of these light fibre conductors have been omitted for the sake of simplicity. According to the invention, the light fibre conductors can at least partially be replaced also by other known light conducting and imaging means, such as for example mirrors, lenses etc.

In the previous description of the manner of effect of a light path change-over switch 10 formed by an oscillatory mirror 45 or a rotating mirror prism, it was presupposed that only in those cases, in which the maximum transmitter power must be used because of very great distance and/or very low reflectivity of the target object, the trigger generator 3 is so controlled in time that the entire quantity of light contained in a light pulse is directed by the light path change-over switch 10 into the entry opening of the light path respectively conducting further. In all other instances, as previously described, the trigger generator 3 is so controlled in time as to provide a desired optical signal damping resulting when the light pulses generated by the transmitter 1 impinge on the light path change-over switch 10 at an instant when it assumes a setting enabling a portion of light contained in the light pulse to reach paths 15 or 11, remaining light energy being absorbed in the measuring apparatus.

This form of the optical signal damping, which resides in an instantaneous partial overlapping of the light paths, lets itself be performed in sensible manner in a distance measuring instrument measuring the transit time of a light pulse only when it is made certain that the light pulse is emitted by a quasi punctiform light source or that, in the case of an areal light source, different surface regions do not light up one after the other and in that case feed their light at different angles for example into a following light fibre conductor. If this condition is not fulfilled, an optical damping through partial overlapping can lead to the timely centre of gravity of the light pulse conducted further experiencing a time displacement in dependence on the chosen damping, i.e. in dependence on the degree of the respective partial overlapping, which displacement can be different for measurement light pulse and reference light pulse and thus not cancel out during the subtraction of the signal transit times, whereby appreciable measurement errors can arise.

If a quasi punctiform light source is not available for use as described with partially overlapping light paths, then according to the invention where an oscillatory mirror or of a rotating prism as used as a light path change-over switch for the measurement or reference light pulses to be damped, several functionally mutually parallel light paths are provided each time, of which each supplies a different, invariable damping value, the timewise control of the trigger generator being related to the instantaneous setting of the light path change-over switch 10 so that the oscillatory mirror 45 or the rotating mirror prism feeds all of the light pulse energy from the transmitter into the correct one of the parallel light paths, where the light pulse is then subjected to the desired damping without an undesired time displacement of the centre of gravity. Although other than in the case of the partial overlapping, no continuous, but only a stepwise change of the damping value is possible with such an arrangement, since however the sensitivity of the avalanche photo-diode of the receiver 23 is influenceable through change in the supply voltage (damping value for example 1:5.5) and the amplifier, which is contained in the receiver 23 and connected behind the avalanche photo-diode, for example can have a dynamic range of 1:6.6, a dynamic range of about 1:36 results for the channel so that the individual damping stages in the parallel light paths can differ one from the other each time by a factor of between 1:30 and 1:35. This leads to an overall dynamic range of more than $1:10^9$ letting itself be attained for example with six parallel light paths and the dynamic range of the amplifier.

For the case that the output power of the transmitter is still variable in the ratio of 1:5, the channel dynamic range increases to 1:180. From this results a corresponding increase in the factor between the individual damping stages.

Figure 3:
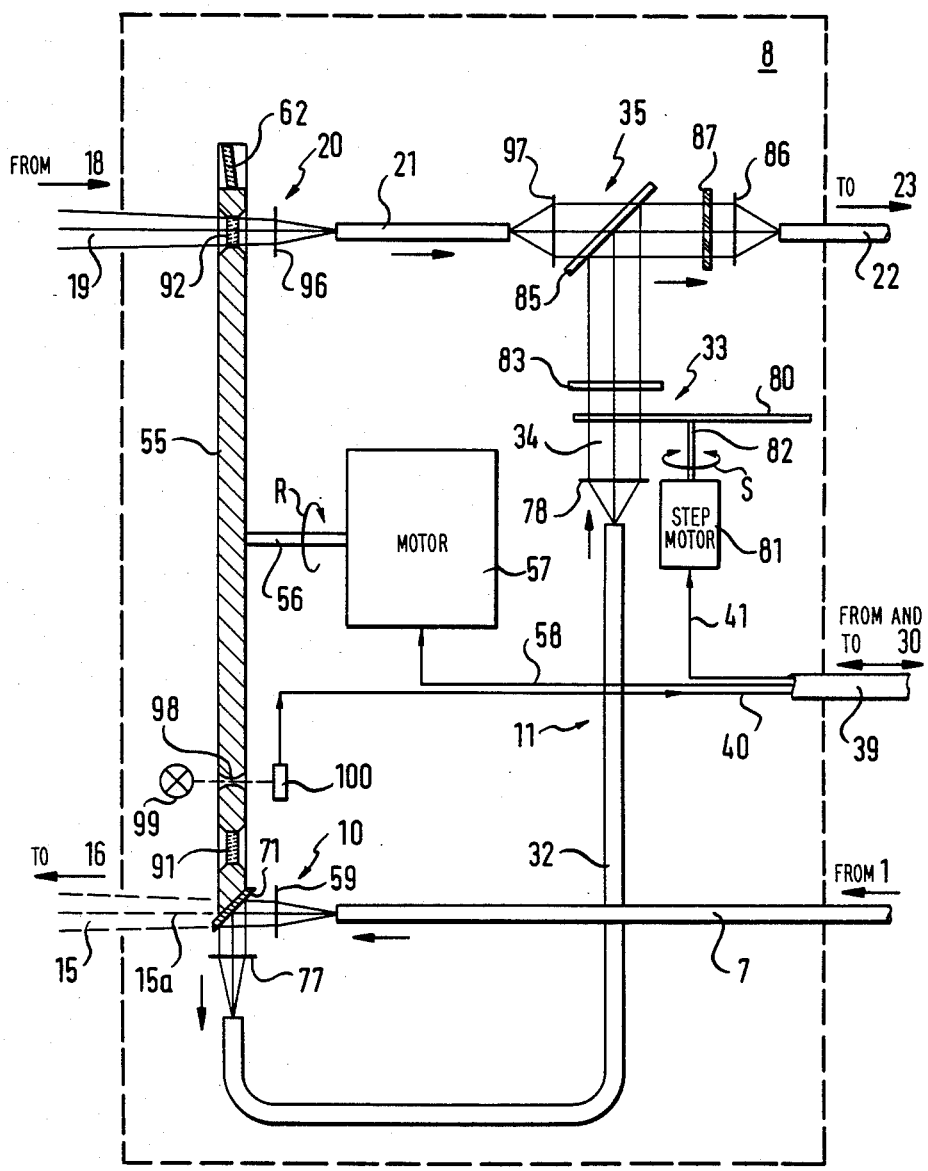
Figure 4:
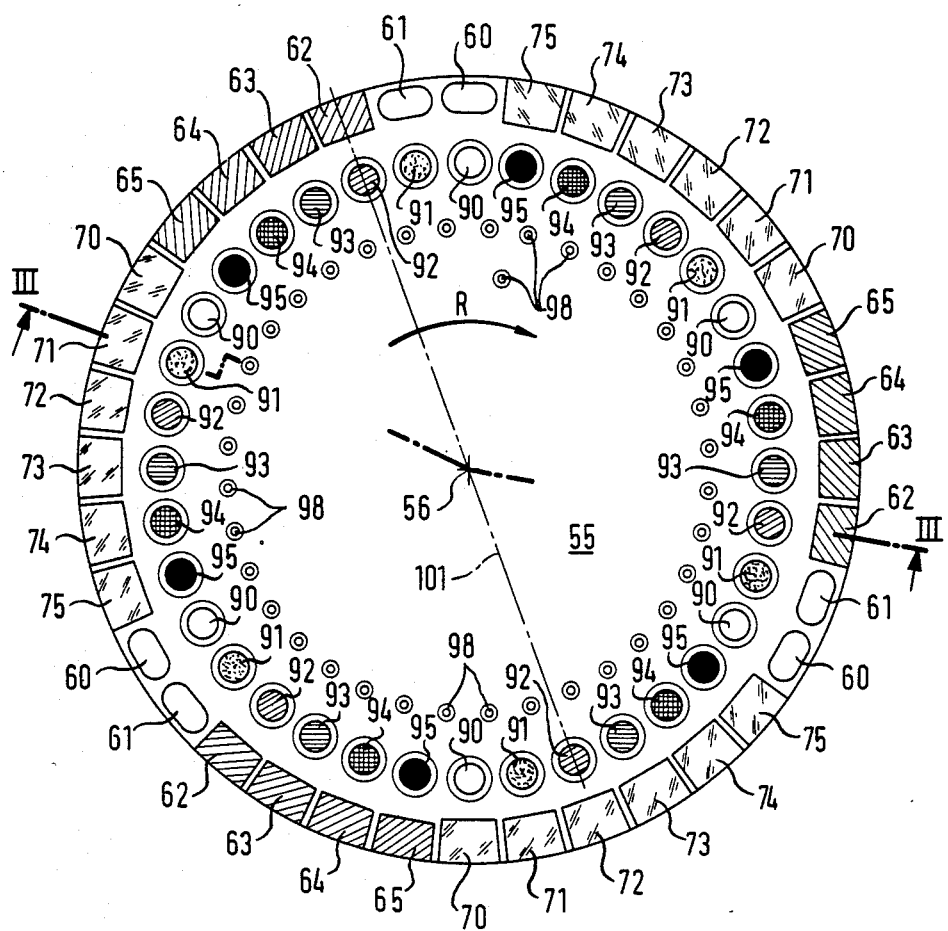
FIG. 4 a front elevation of the damping disc illustrated in section in FIG. 3.

Illustrated in the FIGS. 3 and 4 is a further embodiment of an optical switching and damping unit 8 according to the invention, in which a rotating disc 55 is used in a particularly advantageous manner by incorporating as a single component, the light path change-over switch 10, disposed behind the transmitting light path 7 and the variable optical damper 20 arranged between the receiving measurement light path 19 and the receiving light path 21.

As is evident from the FIG. 3, in which the rotating disc 55 is illustrated in a section following the line III—III from FIG. 4, the disc 55 is so driven by a motor 57 through a shaft 56 for constant rotation in direction of the arrow R.

The approximate constancy of the angular speed of this rotation can be monitored and secured either through a known regulating circuit disposed at the motor 7 or through the central run-down control, arithmetic and evaluating unit 30, which then exchanges data and command signals with the motor 57 through the line 58.

The rotating disc 55 is so arranged that it engages by its outermost peripheral region into the ray path of the light which issues out of the transmitting light path 7, here illustrated as light fibre conductor, and is conducted further with reduced divergence by a lens 59 indicated in FIG. 3 only symbolically by its centre axis.

In this outermost region, the disc 55 has alternating groups of openings 60 to 65 and mirrors 70 to 75. Both the first openings 60 and 61 of each group are formed as holes prolonged in circumferential direction of the disc 55. If the trigger generator 3 is so driven that, with consideration of the corresponding delays, it causes the transmitter 1 to deliver a light pulse just when one of these openings 60 and 61 is disposed in the ray path behind the transmitting path 7, then this light pulse passes completely undamped through the transmitting measurement light path 15, illustrated as free ray path, to the optical transmitting system 16 and from there further to the target object. The remaining openings 62 to 65 each contain a respective damping filter which supplies a comparatively small damping factor, for example of 1:10, and intersects the optical axis of the ray path 15 at an angle differing from 90°.

These damping filters have the following purpose: in the cases, in which a target object, which is disposed at comparatively small distance and which carries a return reflector, shall be measured with the distance measuring instrument, it can in the case of unfavourable setting of the return reflector occur that that part of a light pulse, which is reflected at the optical receiving system 18 and particularly at the end face of the light fibre conductor 21, which here forms the part of the receiving light path leading to the branching point 35, gets by way of the return reflector back to the optical transmitting system 16 and is focused by this onto the end face of the light fibre conductor which forms the transmitting light path 7. Without the damping filters provided in the openings 62 to 65, the part of the light pulse reflected anew at this end face would run with a sufficiently great amplitude over the entire measurement light path as far as the receiver 23 in order there as delayed interference light pulse so to disturb the signal processing operation triggered by the actual measurement light pulse that it comes to erroneous measurements or an unobjectionable time space measurement is made completely impossible. This is prevented by the inclined damping filters mounted in the openings 62 to 65. These openings are namely always used for the emission of measuring shots when no very great distances are to be measured, i.e. thus when the danger exists that the just described interference pulse without further measures has a sufficient amplitude for the disturbance of the measurement. In these cases, in which the light delivered by the transmitter 1 must in any case be damped, it does not represent any problem to damp the transmitted light already before its issue from the measuring instrument by the factor 1:10 caused by the damping filters under discussion. If the light component reflected by the optical receiving equipments then again comes back to the optical transmitting system 16, then during its projection onto the end face of the light fibre conductor 7, it traverses the damping filter disposed in its light path for a first time, during which as during the reflection at the end face of the light fibre conductor 7 and during the repeated passage through the damping filter it is each time weakened in the ratio 1:10 so that a damping by a factor $10^{-3}$ results altogether. The interference light pulse weakened in this manner is in no case any longer in the position of effecting a disturbance of the signal processing of the preceeding measurement light pulse at the receiver 23. By the inclined setting of the damping filters in the openings 62 to 65, it is prevented that light components reflected at the surface of the filter get to the optical transmitting system 16 and thus themselves can become interference signals.

Both the holes 60 and 61, which are each utilized for the emission of measurement shots for far removed target objects, display no such damping filters, since the above described formation of interference reflections here plays no part because of the great distance. The elongate formation of both these openings 60 and 61 beyond that makes it possible to generate the measurement shots for these great distances so early that, in spite of the great distance, the light pulses reflected at the target object arrive at the right time, as explained still more exactly below, at the part of the rotating disc 55 forming the damper 20 and particularly at the receiver 23.

Following each group of holes 60 to 65 in the outer region of the rotating disc 55 is an equally large group of mirrors 70 to 75, which, as is evident particularly from FIG. 3, are so mounted at the disc 55 that their reflecting surface during the traverse of the ray path 15 stands at an angle of 45° to the optical axis of this ray path. If the trigger generator 3 is so driven that it causes the transmitter 1 to deliver a light pulse at the instant, at which one of the mirrors 70 to 75 is disposed in the just described setting illustrated for the mirror 71 in FIG. 3, then this light pulse is deflected through 90° at the mirror and focused by a lens 77 onto the end face of a light fibre conductor 32 forming the front section of the reference light path 11 in FIG. 3.

The reference light pulse thus generated issues at the other end of the light fibre conductor 32, is converted by a lens 78 into a parallel light bundle and traverses a controllable optical damper 33, which is here formed by a grey wedge disc 80, which for the attainment of a desired damping value can be displaced in both directions around its axis 82 with the aid of a stepping motor 81, as is indicated by the double arrow S. Behind the variable optical damper 33, the reference light pulse traverses a damping filter 83, which has a fixedly predetermined damping ratio in order then to be coupled at the branching point 35 with the aid of a partially permeable mirror 85 through an interference filter 87, which is tunable in the centre frequency, into the part 22 of the receiving light path leading to the receiver 23. For this purpose, the parallel light bundle is focused with the aid of a lens 86 onto the end face of the light fibre conductor 22 forming this part of the receiving light path.

The optical damper 33 can also be formed by a PLZT or a PLMNZT platelet.

In a region lying radially further inwards, the rotating disc 55 has successive groups of openings 90 to 95, wherein each of these groups comprises six openings, i.e. just as many openings as the above described groups of openings or mirrors have openings or mirrors in the outer edge region of the disc 55.

The just mentioned openings 90 to 95 lying further inwards are so arranged that, during the rotation of the disc 55, they traverse the receiving measurement light path 19 leading from the optical receiving system 18 to the part 21 of the receiving light path at a place, at which the cross-section of the ray path 19 is with certainty smaller than the diameter of the openings 90 to 95. A lens 96, which focuses the light onto the end face of a light fibre conductor 21 forming the input part of the receiving light path, is arranged behind the rotating disc 55 in the running direction of the light pulse. The measuring light issuing at the other end of this light fibre conductor 21 is converted by a further lens 97 in the same manner into a parallel light bundle, as was described above for the reference light and the lens 78.

Hereupon, the measuring light traverses the inclined partially permeable mirror 85 rectilinearly, i.e. with a very slight weakening, and gets through the interference filter 87 to the lens 86, by which it is focused onto the end face of the light fibre conductor, which forms the part 22 of the receiving light path leading to the receiver 23.

Each of the openings 90 permits an undamped passage of the received light, while filters with different damping ratios are mounted in the openings 91 to 95. It is in that case essential that all holes 91, all holes 92, all holes 93, all holes 94 and all holes 95 of each group each have a filter of the same damping value.

In use of this rotating disc, the measuring light, which for the control of the dynamic range is damped on the receiver side, traverses only a single light path which leads from the transmitted measurement light path 15 through the optical transmitting system 16, the target object, the optical receiving system 18, the received measurement light path 19 and the front part 21 of the received light path 21 and 22 to the branching point 35 and from there further to the receiver 23. It will be appreciated there is no partial overlapping of light paths for damping purposes with the described arrangement and thus errors in distance measurements are minimized.

More specifically, the trigger generator 3 is so controlled in time that it ensures the transmitter 1 will deliver measurement light pulses exactly at such time that not only one of the openings 60 to 65 is in the transmitted measurement light path 15 for letting transmitted light pass through the openings, but also one of the openings 90 to 95 is in the received measurement light path 19. For short and medium distances, this positioning of openings 60 and 65 and 90 to 95 occur virtually simultaneously since the disc 55 at its preferred rotational speed of about 130 revolutions per second is practically stationary during the time it takes the measurement light pulse requires to traverse short and medium distances. Rotational movement of the disc 55 must however be taken into account for transit time measurement of light pulses for long and exceedingly long distances (up to 10 kilometers). This is also one of the reasons, for which the openings 60 and 61 of each group, which are used for the emission of the measurement light pulses for large and very large distances, are extended in circumferential direction of the disc 55 that even a light pulse, which is delivered with an off-target allowance of about 3.1°, can traverse these openings unobstructedly. Hereby, it is possible to deliver the measuring light pulse each time so early that on the return from the target object, it meets the corresponding opening 90 or 91 just in its fully covering setting.

The different dampings required for the control of dynamic range are in this embodiment generated thereby, that filters of different damping factor are brought permanently into one and the same light path through the rotary movement of the disc 55 forming the light path change-over switch 10 and that the trigger generator 3 is so controlled in time in dependence on the movement of the disc 55 that it triggers the transmitter at instants which assure that the measurement light pulse emitted thereupon on its return from the target object will pass through that opening, 91 to 95, which supplies the instantaneously desired damping factor, or through opening 90 where no damping is to be effected. In order that the measurement light pulse at the respective instant can also pass through the rotating disc 55 on the transmitter side, a number of openings 60 to 65 is provided there, which corresponds to the number of the openings 90 to 95, supplying the different dampings, for each group on the receiver side.

In an arrangement, in which transmitting measurement light path 15 and receiving measurement light path 19 lie exactly diametrically opposite each other with reference to the centre of rotation of the disc 55, as illustrated in FIG. 3, because of the above mentioned "simultaneity", with which one each of the transmitted light openings 60 to 65 and the associated one of the receiving light openings 90 to 95 attain the full overlapping with the associated ray paths, the centre of a transmitted light opening 60, 61, 62, 64, 64 and 65 and the centre of the associated receiving light opening 90, 91, 92, 93, 94 and 95 are each time arranged on a common disc diameter, as indicated in FIG. 4 for one of the openings 62 and the associated opening 92 by a chain-dotted line 101. In that case, the receiving light opening 92, which is disposed radially immediately within the transmitted light opening 62, is associated not to this transmitted light opening, but to the diametrically opposite mirror 72.

A respective diametrally opposite receiving light opening 90, 91 and 93 to 95 is also associated with the remaining mirrors 70, 71 and 73 to 75 of each group, wherein each of these receiving light openings contains a filter with the same damping factor as the correspondingly numbered receiving light opening which is associated with an opposite transmitted light opening.

The purpose of this arrangement is also to trigger the reference light pulses at quite definite instants which again depend on the movement or the instantaneous setting of the rotating disc 55. A basic principle of the device according to the invention consists in performing the transit time measurements under conditions, which are as near identical as possible, for measurement light pulses and reference light pulses, the transit times of which shall be deducted one from the other for obtaining the sought distance values. To this belongs not only a far-reaching adaptation of the light intensity of the reference light pulses to that of the associated measurement light pulses, which occurs with the aid of the controllable optical damper 33, but also an adaptation to the respective background brightness. For this purpose, the reference light pulses are not triggered when an arbitrary one of the mirrors 70 to 75 stands in the exit ray path of the transmitter light path 7. On the contrary, each of the reference light pulses is triggered to impinge on the one of the mirrors 70 to 75 to which on the opposite side of the disc 55 a light receiving opening is associated which contains the same filter as that light receiving opening through which the corresponding measuring light pulse had passed on reflection from the target. In this way the receiver 23 "sees" the same ambient brightness and thereby has the same response time behaviour as on the reception of the associated measurement light pulse.

Similarly as for the above described control of dynamic range, which likewise does not operate with partial overlappings and in which the light pulses are directed into different light paths, which are functionally parallel one to the other, but equipped with different damping filters, only a stepwise change in the damping is possible also here with the aid of the disc 55, which however offers no particular difficulties, as already explained above, because of the dynamic range of the receiver 23 standing at disposal in any case.

In order to be able to determine the instantaneous position of the disc 55 and thereby also correctly to choose the driving instants for the trigger generator 3, the disc 55 still further radially inwards has a plurality of holes 98, of which a respective one is associated with a radius arm, on which lies the centre of one of the openings 90 to 95 and of the openings 60 to 65 or the mirrors 70 to 75. These holes 98 serve, with the aid of the light barrier illustrated in FIG. 3 and formed by a light source 99 and a differential photo-diode 100, to deliver signals characterising the respective setting of the rotating disc 55 through the line 40 to the central run-down control, arithmetic and evaluating unit 30, which then in its turn drives the trigger generator 3 correctly in time through the line 51 illustrated in FIG. 1.

One of the holes 98 can, as shown in FIG. 4, have a different spacing from the rotational axis 56 than the remaining holes 98 and be scanned by an individual, not illustrated light barrier, through which an unambiguous position signal is generated for the run-down control, arithmetic and evaluating unit 30 on each rotation of the disc 55. If the initially completely unknown distance of a target object with unknown reflectivity shall be determined by a distance measuring instrument built up according to the invention, then the correct damping must at first be found through the measuring instrument itself in order that exact measurement results can be obtained (accuracy ±1 millimeter for distances up to 10 kilometers).

If one presupposes that the amplifier, which is connected behind the receiving photo-diode in the receiver 23, can amplify signals between 175 millivolts and 1150 millivolts with sufficient linearity and feed them to a further processing, which corresponds to a dynamic range of about 1:6.6, and that the sensitivity of the receiving photo-diode is variable by a factor of 1:5.5 through change in the supply voltage, then a dynamic range, processable by the receiver 23, of about 1:36.3 results and care must be taken through an appropriate damping of the measurement light pulses, which are chosen to be as bright as possible for the attainment of a great range, that the signals arriving at the receiver 23 lie in this processable brightness range. This damping takes place for one part through the measurement path and the reflectivity of the target object (external damping) and for the other part for balancing of the differences, which are possible in this case and which can lie in the order of magnitude of $1:10^9$ to $1:10^{10}$, through the time control, according to the invention, of the trigger generator 3 in dependence on the movement of the disc 55 (internal damping) as well as in some circumstances with the aid of a change in the power delivered by the transmitter 1 (additional channel damping).

If the transmitter power is not alterable, then the measuring instrument to find out the correct internal damping at first presumes a very great distance of the target object and a very high external damping and by way of trial emits a first measurement light pulse through one of the openings 60 with an off-aim allowance corresponding to a great distance so that the reflected light pulse comes back through the associated opening 90 effecting no damping. In that case, the receiving photo-diode is switched to maximum sensitivity.

The receiver 23 in an in itself known manner comprises a comparator which monitors whether the output signal, to be amplified, of the receiving photo-diode or of an oscillatory circuit connected behind it exceeds the upper limit of 1150 millivolts. If this is not the case, then this means that indeed a very remote and/or badly reflecting target object was measured and that the correct internal damping value, namely 1:1, has already been found.

If however the comparator delivers an overload signal, because the 1150 millivolts were exceeded, then the central run-down control, arithmetic and evaluating unit 30 on the one hand rejects the time measurement value obtained in this manner, because it entails with certainty too large a measurement error, and on the other hand reduces the sensitivity of the receiving photo-diode in the ratio 1:5.5. This takes place so rapidly that a second measurement light pulse can be delivered already through the next opening 60 traversing the transmitted measurement light path 15, which pulse then again gets to the receiver 23 through the associated opening 90 effecting no damping.

If the overload comparator responds again, then also this measurement value is rejected, the sensitivity of the receiving photo-diode again switched to the high value and the next measuring light pulse is so emitted that it leaves the measuring instrument through one of the openings 61 and returns through the associated opening 91, in which is disposed a filter with a damping factor of 1:30. Thereby, it is secured for the case, that the threshold value of 1150 millivolts was exceeded only slightly during the preceding measuring light pulse, that the amplifier contained in the receiver 23 now receives not too small a signal, i.e. falling below the lower limit of 175 millivolts, but a signal lying within the operating range aimed at.

Should the overload comparator respond also on this third trial, then the next measurement light pulse is again emitted through one of the openings 61 and received through the associated opening 91, for which however the sensitivity of the receiving photo-diode is again reduced in the ratio 1:5.5.

If also this leads to an overload of the receiver amplifier, when the sensitivity of the receiving photo-diode is again increased and the next measurement light pulse is delivered through one of the openings 62, which for the suppression of interfering light reflections contains an inclined filter with a damping factor of 1:10, as described in detail above. This damping of the emitted measuring light is readily tolerable for the reason that the preceding measurement trials have after all shown that a damping of 1:30 does not suffice to avoid an overloading of the receiver amplifier. The reflected light pulse then gets through the opening 92 associated with the opening 62 to the receiver 23, in which a filter with a damping factor of 1:100 is arranged so that this light pulse has experienced an internal damping altogether of 1:1000. This damping value is just so chosen that it is somewhat smaller than the product of the damping value of the preceding receiving light openings, in this case the receiving light opening 91, and of the dynamic value of the receiver 23. The same applies also to the damping values in the succeeding receiving light openings 93 to 95, which each contain a filter with a damping factor of $1:3.10^3$, $1:10^5$ or $1:3.10^6$, which on conjunction with the damping factors contained in the associated transmitting light openings 63, 64 and 65 results in total internal damping factors of $1:3.10^4$, $1:10^6$ or $1:3.10^7$, so that an overall dynamic range of more than $1:10^9$ lets itself be attained when taking into consideration the dynamic range of the receiver 23.

If the overload comparator responds also for the measurement light pulse delivered through the transmitted light opening 62 and received through the associated receiving light opening 92, then the sensitivity of the receiving photo-diode can at first again be reduced and the above described procedure can be continued altogether with the use of ever higher damping stages in the succeeding openings 93 to 95 until finally the overload comparator no longer responds and the correct damping value has been found.

If the transmitter power is likewise variable, for example in the ratio of 1:5, then each time the overload comparator responds with a damping given by one of the openings 90 to 95 and the receiving diode switched to minimum sensitivity, a further measurement trial is at first undertaken with reduced transmitter power before the switching-up of the sensitivity and the use of the next stronger damping filter in one of the openings 91 to 95. Since a dynamic range of altogether 1:180 is attainable in this case through switching-over of the receiver and of the transmitter, filters, which correspondingly differ more strongly one from the other in their damping values, can be provided in the openings 91 to 95 in the disc 55 and a still greater overall dynamic range can thus be covered. With the overall dynamic range remaining the same, the number of the openings displaying different damping filters, i.e. the number of the openings per group, can be reduced and a correspondingly higher number of measurement and reference light pulses can be delivered for each revolution of the disc 55.

Provided in the receiver 23 apart from the already mentioned circuits is an amplitude-amplifying and rectifying circuit, to which the amplified output signal of the oscillatory circuit connected behind the receiving filter-diode is conducted. When the correct damping has been found for the measuring light pulse, then the unidirectional voltage signal delivered by this rectifier is retained in a sample-and-hold circuit until it has been converted by an analog-digital converter into a digital number value which is then again conducted to the central run-down control, arithmetic and evaluating unit 30 and stored there.

According to a particularly preferred method, a measurement light pulse and a reference light pulse are always generated alternatively with the found damping for the determination of a particularly exact distance measurement value and, beyond that, a calibration measurement is still undertaken in the time measuring device 25 between each two successive light pulse transit time measurements.

In that case, as already mentioned above, the reference light pulses are deflected by way of that one of the mirrors 70 to 75, which is associated with that one of the openings 90 to 95, which has a damping filter of the same damping factor as also finds use during the measuring light transit time measurement in order that the ambient brightness is damped in the same manner for the measurement light pulses and the reference light pulses.

For the adaptation of the amplitude of the reference light pulses to the amplitude of the measurement light pulses, as already mentioned, a fixed damping filter 83 with invariable damping factor and an optical damper 33 with variable damping factor are arranged in the reference light path 11.

As already mentioned, the internal damping must be varied within a very great range for the measurement light pulses, since the external damping can very over a correspondingly large range. The target aimed at is in that case always to keep the ratio of the smallest to the maximum light intensity impinging on the receiving photo-diode within the dynamic range of 1:36 processable by the receiver 23, which in a given case is still to be multiplied by the ratio (1:5) which can be obtained through the switching-over of the transmitter power; this is attained thereby, that for great external damping, a correspondingly small internal damping and, in a given case, a high transmitter power and, conversely, with small external damping, a correspondingly great internal damping and, in a given case, a small transmitter power is chosen.

For this reason, the change in the amplitude of the measuring light pulses arriving at the receiving photo-dioode can at most lie in a range of 1:36 or 1:180 and the controllable optical damper 33 incorporated in the reference light path need merely be in a position to weaken the reference light pulses in this ratio, while the remaining range of $1:3.10^7$ can be managed by the fixed damping filter 83 and the inclined, partially permeable mirror 85. If one now assumes for example that the inclined mirror lets 99% of the impinging light through rectilinearly, which is required for a least possible damping of the measuring light, and deflects only 1%, i.e. thus delivers a damping factor of 1:100 for the reference light, then the damping filter 83 must have a damping factor of about $3.10^{-5}$.

In the remaining range of 1:36 or 1:180, the adaptation of the amplitudes of the reference light pulses to that of the measurement light pulses takes place thereby, that also the unidirectional voltage signal delivered by the above mentioned rectifier on the reception of a reference light pulse is intermediately stored in the sample-and-hold circuit and digitalized and the thus obtained digital value is compared with the previously obtained digital value of the associated measuring light pulse. If the deviation is greater than a predetermined tolerance range, then the stepping motor 81 is so displaced by corresponding command signals supplied through the line 41 that the grey wedge disc 80 weakens the next reference light pulse in the correct manner.

When the correct damping values have been found in this manner for the measurement light pulses as well as also for the reference light pulses, then the above mentioned series of measurement light and reference light transit time measurements and calibration processes can devolve and, from the individual measurement values obtained in that case, mean values can be formed, from which the sought distance measurement value can be calculated.

It is of particular importance in that case that the entire receiving channel and particularly also the time measuring circuit 25 is operated strictly periodically in order that the measurement accuracy can be brought to the values stated above. A particular advantage of the just described embodiment of the light path changeover switch 10 consists in that the rotating disc 55 actually makes possible such a strictly periodical operation of the receiving channel and of the time measuring device connected therebehind, after the correct damping has once been formed. The disc 55 after all has three respective groups of transmitting light openings 60 to 65 and mirrors 70 to 75 and the associated receiving light openings 90 to 95, as is evident particularly from FIG. 4. This means that three measurement light pulses and intersperced therebetween, three reference light pulses are delivered at exactly equal intervals for each rotation of the disc and the associated signal transmit times can be measured. The time interval between the transmission and reception of a measurement light pulse is dependent on the distance of the target object, but this can be compensated for by a corresponding off-aim time allowance of the drive of the trigger generator 3. For this purpose, the central run-down control, arithmetic and evaluating unit 30 by a first measurement trial, not yet displaying any strict periodicity relative to the further measuring operations, determines the approximate distance of the target object, which because of the aperiodicity of the measurement courses can still involve an error which is appreciable by comparison with the aimed-at accuracy of ±1 millimeter. Yet, this distance determination is sufficiently accurate in order then to be able to calculate the off-aim time allowance required for a strict periodicity of the further measurement and reference shots. Since, as already mentioned, the transit time of the measurement light pulse by comparison with the rotational speed of the disc 55 plays no part for short and medium distances, the condition of the full covering of the transmitting and receiving light openings with the transmitting measurement light path or the receiving measurement light path is not disturbed by the just mentioned off-aim time allowance. For great and very great distances, the required off-aim time allowance can because of the elongate formation of the transmitting light openings 60 and 61 likewise be performed while keeping to the above condition.

Concerning the grey wedge disc 80 or a corresponding PLZT or PLMNZT platelet forming the controllable optical damper 33, it is still remarked that it is advantageous to choose its damping range of, for example, 1:72 or 1:360 to be twice as great as the dynamic range of 1:36 or 1:180 predetermined by the receiver 23 in a given case together with the transmitter 1. Thereby, account can be taken of the fact that the power of the transmitting diode generally in the course of time reduces to half. Apart from a corresponding shortening of the maximally measureable distance, this has no further disadvantageous consequences if one takes care of a corresponding compensation through the above measure in the reference light path 11.

Figure 5:
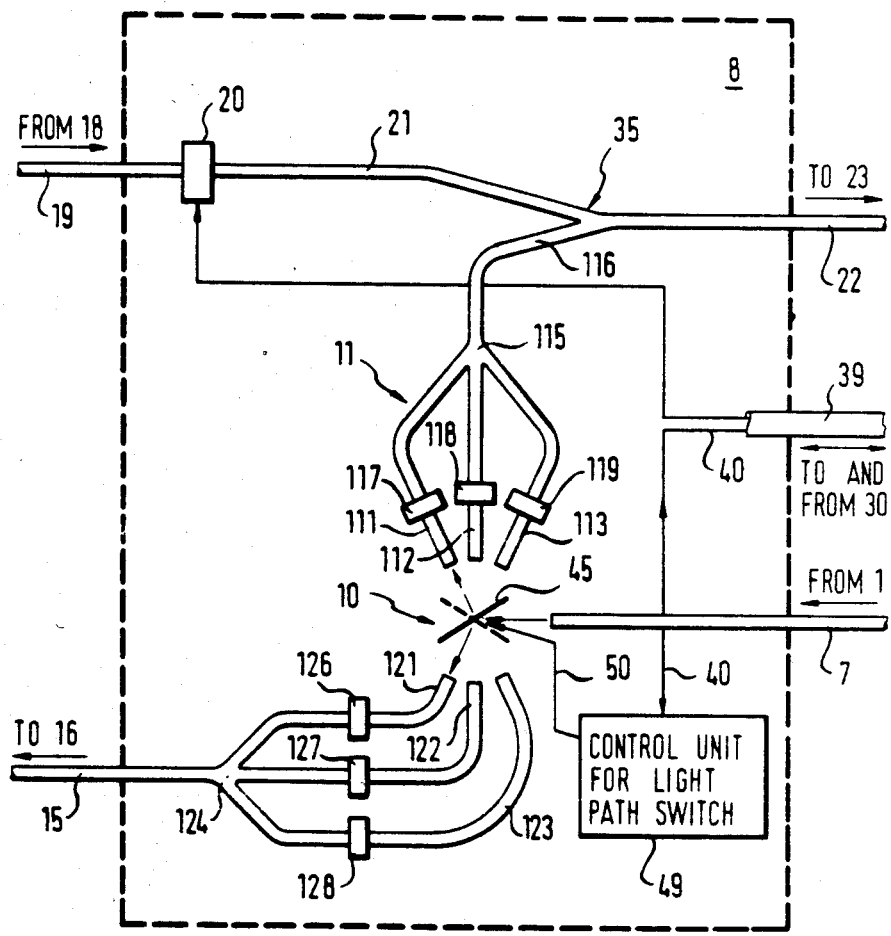
FIG. 5 is a third embodiment of an optical switching and damping unit in accordance with the invention.

FIG. 5, in which the same numerals are used as in FIG. 2 for corresponding parts, shows a further embodiment for direct intensity control by a light changeover switch 10, which takes the form of an oscillating mirror 45 which is movable between two end positions, one of which is shown by a continuous line and the other by a dotted line.

In this embodiment, the reference light path 11 has three entrance sections 111,112,113 merging at branch point 115, the reference light path including light path 116 which feeds the reference light pulses via branch point 35 into light path section 22 in the receiving light path leg leading to the receiver 23.

Each entrance section incorporates, as shown, an attenuation member 117, 118 and 119, each of which provides a different degree of attenuation. During each cycle of the periodical movement of the mirror before and after attaining the shown dotted line position in which it completely reflects an incident light pulse into the entrance section 111, the mirror 45 moves through two other positions in which it reflects an incident light pulse with its total energy into entrance section 112 or 113, respectively. Therefore, by controlling the triggering time of the emitter 1 in dependence of the movement of mirror 45, three different attenuation values can be obtained for a reference light pulse. If, for example, the attenuation factors of the attenuation members 117, 118 and 119 are 1:10, 1:100 and 1:1000, respectively, and, if for a certain reference light pulse an attenuation of 1:1000 is required, the emitter 1 is triggered to emit a light pulse at a time, which is correlated with the movement of mirror 45 so that the light pulse hits the mirror 45 when the mirror is positioned to reflect the transmitted light pulse completely into entrance section 113 of the reference path. This reference pulse on passing attenuation member 119 will be attenuated 1:1000.

Similarly, the transmitting light path has three entrance sections 121,122,123 merging at branch point 124 and continuing along light path 15. Here also, each of the entrance sections 121,122, 123 incorporate, as shown, an attenuation member 126, 127, 128, each providing a different degree of attenuation. During each cycle of the period movement of the mirror, before and after attaining the position shown in solid line, in which it completely reflects an incident light pulse into entrance section 121, the mirror 45 moves through two other positions in which it reflects an incident light pulse with its total energy into entrance sections 122 or 123, respectively. Thus, by controlling the triggering time of the emitter in dependence on the movement of the mirror, one of three different attenuation factors can be obtained for each measuring light pulse.

While three entrance sections for the reference light path and for the transmitting light path have been disclosed, it is obvious that any appropriate number may be used.

Furthermore, the number of entrance sections used for the reference light path may be different from that of the entrance sections used for the transmitting light path. The attenuation factors of the attenuation members 126, 127, 128 may be the same as or may be different from the attenuation factors of members 117, 118, 119.

If desired, an additional controllable attenuator 20 may be provided for the reflected part of the measuring light pulse and positioned in light path 21 as shown in this figure.

Figure 6:
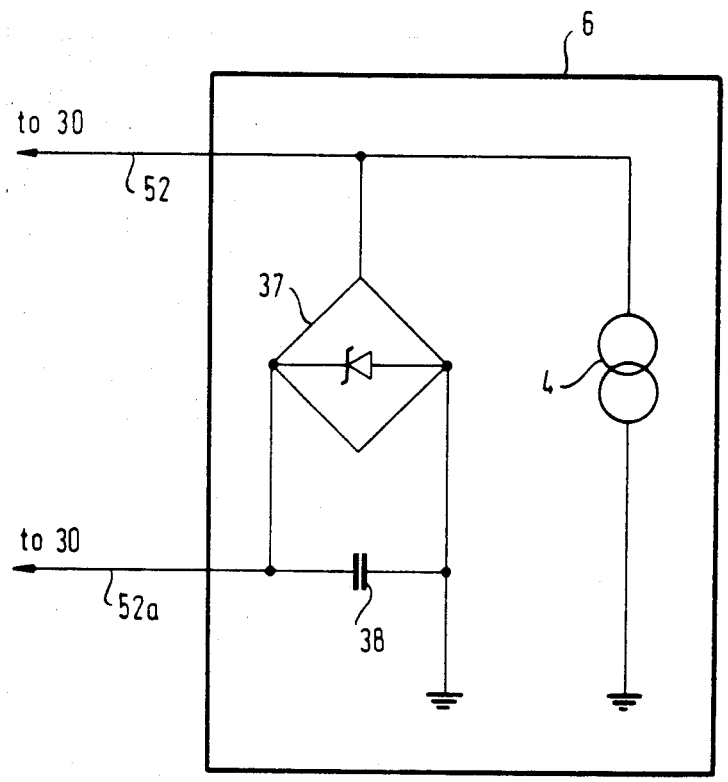
FIG. 6 is a block diagram of the voltage supply unit for the distance measuring apparatus of the invention.

FIG. 6 is a block diagram representation of a vibrating converter symbolically shown at 4. The converter, as known, produces rectangular pulses which by means of line 52 are supplied to run-down control 30. As previously disclosed, the run-down control 30 provides on line 51 an activating signal to the trigger generator 3. In response to this activating signal the trigger generator 3 produces the trigger signal which is transmitted as a start signal on line 27 to the time measuring device 25 which thereupon starts the time of travel measurement for the corresponding light pulse. The actual light pulse, it will be recalled, is generated a little later since the trigger signal is fed to the transmitter 1 via delay 2 introducing a time delay. The delay ensures that the time measuring device 25 has received and reacted to the start signal before transmitter 1 is triggered, since this triggering produces heavy interference signals.

Figure 7:
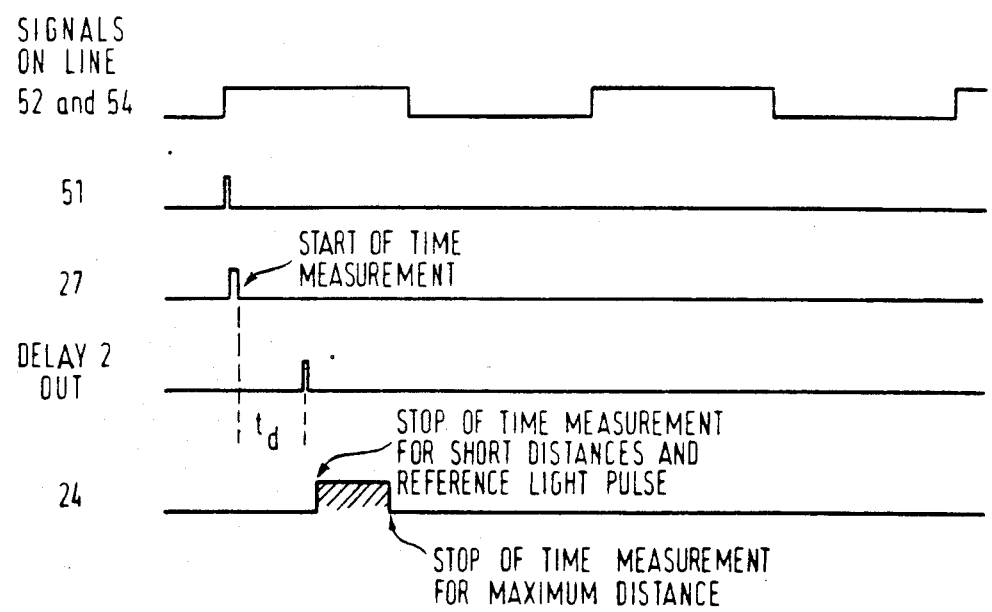
FIG. 7 shows voltage signals used in the operation of the apparatus shown in FIG. 1.

FIG. 7 in the first representation shows the signals on line 52 fed to the control unit 30. The activation signal on line 51 is shown in the second representation in FIG. 7 which additionally shows in the third representation the time at which measurement of a light pulse is started. The delay $t_d$ in generating the light pulses by transmitter 1 and occasioned by delay 2 is shown in the fourth representation. The last representation shows the time during which measurement is stopped for short and long distances. It is to be observed that the start and stopping of the measurement is within the interval of the pulse edges of the wave form on line 52.

FIG. 6 also shows a buffer capacitor 38 in a rectifying voltage circuit associated with the vibrator 4 for supplying current supply.

If it is elected to suppress oscillations of the vibrating converter during which start and end measurements are made of the transit time of a pulse, buffer capacitor 38 during such compression provides the current supply for the apparatus.

We claim:

1. Distance measuring apparatus for measuring the transit times of individual unmodulated measuring light pulses to a target and therefrom, by reflection, back to the apparatus and of individual unmodulated reference light pulses propagated inside the apparatus which for these purposes comprises:

a transmitter driven by a trigger signal from a trigger generator for emitting individual unmodulated light pulses of short duration, a first light path from the transmitter to a light path change-over switch, a second light path from the change-over switch to an optical transmitting means for transmitting individual measuring light pulses toward said target, an optical receiving means for receiving individual reflected unmodulated measuring light pulses from said target, a third light path from said optical receiving means to an electro-optical receiver for supplying to said receiver individual reflected measuring light pulses, a reference light path from said change-over switch to said electro-optical receiver, said reference light path establishing predetermined transmit times for reference light pulses, a control means for controlling said light path change-over switch to direct light pulses from said first light path alternately into said second light path for use as measuring light pulses or into said reference light path for use as reference light pulses, a time measuring means for transmit time measurements of individual light pulses which measurement is initiated by a start signal related to the trigger signal from the trigger generator, said time measuring means also being operatively connected to said electro-optical receiver for receiving therefrom a stop signal on receipt of individual unmodulated light pulses for terminating said transit time measurement of said individual light pulse, a storage and computing means for storing transmit time measurement values and subtracting transit time measurement values of individual reference light pulses from transit time measurement values of corresponding individual measuring light pulses, dynamic damping means for attenuatng an optical light pulse travelling within a relevant light path, said dynamic damping means comprising a movable attenuator element providing different attenuation values determined by the position thereof in said relevant light path and means for monitoring the movement of said attenuator element, said monitoring means being operatively connected to a control means for controlling the trigger generator to produce its trigger signals in timed relation to the movement of said attenuator element.

2. Apparatus according to claim 1, wherein the light path change-over switch is a movable member which simultaneously serves as movable attenuator element.

3. Apparatus according to claim 2, wherein the attenuator element is moved periodically.

4. Apparatus according to claim 2, wherein the trigger generator signals are provided at predetermined positions of the light path change-over switch whereby to attain predetermined damping of the optical light fed to the second and reference paths.

5. Apparatus according to claim 2, wherein the second and reference light paths comprise a plurality of sections and wherein the trigger generator signals are produced at predetermined positions of the light path change-over switch for feeding the total light energy in the light pulses into a selected one of the plurality of parallel sections of the second light path or into a selected one of the plurality of parallel sections of the reference light path, each of the parallel sections in the second and reference light paths having damping elements of different damping factor.

6. Apparatus according to claim 2, wherein the trigger generator signals are produced at predetermined positions of the light path change-over switch, the latter being incorporated in a disc provided with circumferentially arranged damping means, the instantaneous positions of the damping means on the disc being correlated to the timing of the trigger generator signals.

7. Apparatus according to claim 2, wherein the light path change-over switch comprises a mirror periodically moved to and fro to alternately direct the light pulses into the second and reference light paths, the mirror setting for feeding the reference light and transmitted light into the reference and second light paths being different from the reversing point of the mirror.

8. Apparatus according to claim 2, wherein the light path change-over switch comprises a rotating prism having reflecting side surfaces which during rotation of the prism alternately deflect the transmitted light into the second and reference paths.

9. Apparatus according to claim 6, wherein said rotating disc has a rotational axis parallel to the second light path and being provided with at least one opening for passing therethrough said transmitted light to said second path and further provided with at least one mirror for deflecting the transmitted light through a predetermined angle into the reference light path.

10. Apparatus according to claim 9, wherein the disc has a plurality of openings enabling the transmitter light to pass into the second light path, said disc also having a plurality of mirrors for deflecting the transmitted light into the reference light path, said plurality of openings and said plurality of mirrors being circumferentially arranged about said disc at the same radial distance from the rotational axis of the disc, a filter damping means being provided in at least one of the plurality of openings.

11. Apparatus according to claim 10, wherein the disc has a further plurality of openings adapted to be positioned in relation to the third light path to permit reflected light pulses to pass through said further openings into said third light path, said further openings being circumferentially arranged about said disc at the same radial distance from the rotational axis of the disc, the radial distance of the further openngs being different from the radial distance of the first-named openings and mirrors, a filter damping means being provided in at least one of the further openings.

12. Apparatus according to claim 11, wherein said further openings in the disc are provided as recurring groups, each of which has an undamped opening, the remaining openings in each group being provided with a damping filter of different attenuation, the undamped opening and the damped openings in each group being arranged in the same sequence.

13. Apparatus according to claim 12, wherein the damped openings in each group have attenuation factors which differ by a factor smaller than the ratio of the greatest to the smallest signal amplitude processable by said photo-electric receiver.

14. Apparatus according to claim 12, wherein the attenuation factors of the damping filters differ by a factor smaller than the product of (a) the ratio of the greatest to the smallest signal amplitude processable by the photo-electric receiver and (b) the ratio of the greatest to the smallest power deliverable by the transmitter.

15. Apparatus according to claim 11, wherein first groups of said further openings are disposed radially inwardly and in radial alignment with groups of said first-named openings, second groups of said further openings being disposed radially inwardly and in radial alignment with groups of said plurality of mirrors, said groups of said first-named openings being alternated with said groups of mirrors circumferentially about said disc, each group of said first-named openings comprising one circumferentially extending opening having no damping filter and several further openings, each having a damping filter inclined to the optical axis of said second light path an an angle being different from 90°, all damping filters in said several further openings having the same attenuation factor.

16. Apparatus according to claim 11, wherein the disc has at least one additional opening spaced from the rotational axis a distance less than the distance of said further openings from said rotational axis, said at least one additional opening on each revolution of the disc providing an indication of the instantaneous position of the disc to enable monitoring of its rotational speed.

17. Apparatus according to claim 16, wherein a plurality of said additional openings are provided at predetermined angular spacing about the circumference of the disc radially inwardly of said further openings, each said additional openings being positioned on a radius lying between the radii passing through said further openings and said mirrors and said further openings and said first-named openings.

18. Apparatus according to claim 10, wherein a partially permeable mirror is provided in said third light path to deflect reference light from the reference path to said receiver, said partially permeable mirror being positioned obliquely to the third light path between the rotating disc and said photo-electric receiver.

19. Apparatus according to claim 18, wherein said reference light path includes a fixed damping member and a variable damping member providing variable attenuation, said fixed and variable damping members being serially disposed in the reference light path.

20. Apparatus according to claim 19, wherein the ratio of maximum to minimum attenuation of the variable damping member is at least equal to the product of a numerical value related to permissible transmitter power reduction, due to sustained use of the transmitter, and the ratio of the maximum to the minimum signal amplitude which is prossessable by the receiver.

21. Apparatus according to claim 18, wherein the ratio of maximum to minimum attenuation of the variable damping member is the product of said numerical value and said ratio of maximum to minimum signal amplitude multiplied by the ratio of the maximum to minimum power deliverable by the transmitter.

22. Apparatus according to claim 18, wherein the variable damping member is rotatable by a stepping motor.

23. Apparatus according to claim 18, wherein a signal for varying the damping member is provided by a run down, arithmetic and evaluating control unit, said control unit being operatively connected with said receiver and said time measuring means, said signal being obtained on comparing the amplified and rectified outputs of said receiver respectively related to received reflected light pulses and reference light pulses.

24. Apparatus according to claim 1, including a vibratory converter serving for the generation of required voltages, the trigger generator being operated under control of voltages derived from the vibratory generator, the control being such that the start and end of the signal transit time measurements occur within the interval of the pulse edges of the vibrating converter.

25. Apparatus according to claim 1, including a vibratory converter for generating required voltages, wherein oscillations of the vibratory converter are suppressed during the periods into which start and end of a signal transit time measurement falls, a buffer capacitor in a DC rectifying network supplying the necessary current supply during the suppression periods.

26. Distance measuring apparatus for measuring the transit time of an individual unmodulated measuring light pulse to a target and therefrom, by reflection, back to the apparatus which for this purpose comprises a transmitter driven by a trigger signal from a trigger generator for emitting individual unmodulated measuring light pulses of short duration, an optical receiving means including an electro-optical receiver and a time measuring means for transit time measurement of an individual measurement light pulse, which measurement is initiated by a start signal related to the trigger signal from the trigger generator, said time measuring means also being operatively connected to said electro-optical receiver for receiving therefrom a stop signal on receipt of an individual reflected unmodulated measuring light pulse by the receiver for stopping said transit time measurement of said individual measuring light pulse, a first light path from the transmitter to an optical transmitting means for transmitting individual light pulses toward said target, a second light path from said receiver to an optical receiving means for supplying to said receiver individual reflected measuring light pulses received by said optical receiving means from the target, a reference light path between the first and second light paths and communicating therewith, said reference light path establishing predetermined transit times for a reference light pulse, a light path change-over switch communicating with the first and reference light paths for supply of a transmitted pulse to said optical transmitting means and to said reference light path, said trigger signal from said trigger generator being timed in relation to said light path change-over switch for sequentially directing light pulses into said first light path and said reference light path, said light path change-over switch comprising a rotating disc having a rotational axis parallel to the first light path and being provided with at least one opening for passing therethrough said transmitted light to said first path and further provided with at least one mirror for deflecting the transmitted light through a predetermined angle into the reference light path.

27. Distance measuring apparatus for measuring the transit times of individual unmodulated measuring light pulses to a target and therefrom, by reflection, back to the apparatus and of individual unmodulated reference light pulses propogated inside the apparatus which for these purposes comprises:

- a transmitter driven by a trigger signal from a trigger generator for emitting individual unmodulated light pulses of short duration,
- a first light path from the transmitter to a light path change-over switch,
- a second light path from the change-over switch to an optical transmitting means for transmitting individual measuring light pulses toward said target,
- an optical receivng means for receiving individual reflected unmodulated measuring light pulses from said target,
- a third light path from said optical receiving means to an electro-optical receiver for supplying to said receiver individual reflected measuring light pulses,
- a reference path from said change-over switch to said electro-optical receiver, said reference light path establishing predetermined transit times for reference light pulses,
- a control means for controlling said light path change-over switch to direct light pulses from said first light path alternately into said second light path in order to use them as measuring light pulses or into said reference light path in order to use them as reference light pulses,
- a time measuring means for transit time measurements of individual light pulses which measurement is initiated by a start signal related to the trigger signal from the trigger generator, said time measuring means also being operatively connected to said electro-optical receiver for receiving therefrom a stop signal on receipt of the respective individual unmodulated light pulse for stopping said transit time measurement of said individual light pulse,
- a storage and computing means for storing transit time measurement values and subtracting transit time measurement values of individual reference light pulses from transit time measurement values of individual measuring light pulses, and
means for monitoring the movement of said light path change-over switch, said monitoring means being operatively connected to a control means controlling the trigger generator to produce its trigger signals in timed relation to the movement of said light path change-over switch for sequentially directing light pulses into said second light path and said reference light path, said light path change-over switch comprising a rotating disc having a rotational axis parallel to the second light path and being provided with at least one opening for passing therethrough said transmitted light to said second path and being provided with at least one mirror for deflecting the transmitted light through a predetermined angle into the reference light path.

* * * * *